United States Patent
Izumi et al.

(10) Patent No.: US 9,999,880 B2
(45) Date of Patent: Jun. 19, 2018

(54) PURIFICATION METHOD FOR PURIFYING WATER IN A SPENT FUEL POOL IN A NUCLEAR POWER PLANT

(71) Applicant: EBARA CORPORATION, Tokyo (JP)

(72) Inventors: Takeshi Izumi, Tokyo (JP); Makoto Komatsu, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 748 days.

(21) Appl. No.: 14/520,635

(22) Filed: Oct. 22, 2014

(65) Prior Publication Data

US 2015/0117588 A1    Apr. 30, 2015

(30) Foreign Application Priority Data

Oct. 24, 2013 (JP) ................. 2013-221135

(51) Int. Cl.
| | |
|---|---|
| *G21F 9/12* | (2006.01) |
| *B01J 47/028* | (2017.01) |
| *B01J 47/04* | (2006.01) |
| *C02F 1/42* | (2006.01) |
| *C02F 1/70* | (2006.01) |

(Continued)

(52) U.S. Cl.
CPC ............ *B01J 47/028* (2013.01); *B01J 41/05* (2017.01); *B01J 47/026* (2013.01); *B01J 47/04* (2013.01); *C02F 1/42* (2013.01); *C02F 1/705* (2013.01); *G21C 19/307* (2013.01); *G21F 9/12* (2013.01); *C02F 2001/422* (2013.01); *C02F 2001/425* (2013.01); *C02F 2001/427* (2013.01); *C02F 2101/006* (2013.01); *C02F 2101/10* (2013.01);

(Continued)

(58) Field of Classification Search
CPC ........ B01J 47/028; B01J 41/05; B01J 47/026; B01J 47/04; C02F 1/42; C02F 1/705; C02F 2001/422; C02F 2001/425; C02F 2001/427; C02F 2101/006; C02F 2101/10; C02F 2103/023; C02F 2103/04; G21C 19/307; G21F 9/12
USPC ......................... 376/313; 210/290, 668, 682
See application file for complete search history.

(56) References Cited

U.S. PATENT DOCUMENTS

2008/0128360 A1    6/2008 Reitzner et al.

FOREIGN PATENT DOCUMENTS

| CA | 2209330 A1 | 1/1998 |
|---|---|---|
| DE | 10 2005 038415 A1 | 2/2007 |

(Continued)

OTHER PUBLICATIONS

Polshettiwar, "Silica-supported Pd catalysts for Heck coupling reactions", Tetrahedron 63 (2007) 6949-6976. (Year: 2007).*

(Continued)

*Primary Examiner* — Jack W Keith
*Assistant Examiner* — Daniel Wasil
(74) *Attorney, Agent, or Firm* — Pearne & Gordon LLP

(57) ABSTRACT

A method for purifying water in a spent fuel pool in a nuclear power plant, the method including passing the water at a linear flow velocity of 50 m/h or less through a purification apparatus. The apparatus includes an ion exchange resin layer and a metal-doped resin layer laid at a bed height of 2 cm or more on a surface layer of the ion exchange resin layer. The method includes contacting the water with the metal-doped resin layer to decompose a pro-oxidant contained in the water and subsequently contacting the water with the ion exchange resin to produce purified water.

4 Claims, 3 Drawing Sheets

(51) Int. Cl.
    *G21C 19/307*     (2006.01)
    *B01J 47/026*     (2017.01)
    *B01J 41/05*     (2017.01)
    *C02F 101/00*     (2006.01)
    *C02F 101/10*     (2006.01)
    *C02F 103/02*     (2006.01)
    *C02F 103/04*     (2006.01)

(52) U.S. Cl.
    CPC .... *C02F 2103/023* (2013.01); *C02F 2103/04* (2013.01)

(56) References Cited

FOREIGN PATENT DOCUMENTS

| EP | 0 816 294 A2 | 1/1998 |
|---|---|---|
| GB | 2 356 583 A | 5/2001 |
| JP | S58-169097 A | 10/1983 |
| JP | H10-111387 A | 4/1998 |
| JP | 2000-002787 A | 1/2000 |
| JP | 2003-156589 A | 5/2003 |
| JP | 2006-192354 A | 7/2006 |
| JP | 2008-232773 A | 10/2008 |
| JP | 2014-071004 A | 4/2014 |

OTHER PUBLICATIONS

Gholap, "Copper- and Ligand-Free Sonogashira Reaction Catalyzed by Pd(0) Nanoparticles at Ambient Conditions under Ultrasound Irradiation", J. Org. Chem., vol. 70, No. 12, (2005) 4869-4872. (Year: 2005).*

Extended European Search Report for Application No. 14189651.4 dated Dec. 15, 2014.

* cited by examiner

PURIFICATION METHOD FOR PURIFYING WATER IN A SPENT FUEL POOL IN A NUCLEAR POWER PLANT

FIELD OF THE INVENTION

The present invention relates to a treatment method and apparatus for spent fuel pool water from nuclear power plants, particularly to a purification method and apparatus for decomposing and removing pro-oxidants contained in spent fuel pool water, such as hydrogen peroxide, and a treatment method and apparatus for spent fuel pool water that incorporate the purification method and apparatus.

BACKGROUND

To purify spent fuel pool water from nuclear power plants and recycle the purified water as cooling water for spent fuel rods, a demineralizer using a granular ion exchange resin is placed as a purification device for fuel pool water. This demineralizer is placed to inhibit corrosion of stored spent fuels and various materials and remove radioactive substances from pool water, thus maintaining long-term soundness, such as decreased radiation exposure of operators.

In the demineralizer, it is necessary to replace ion exchange resins having degraded performance by fresh resins. In this case, since a volume of spent ion exchange resins are generated as a radioactive waste, the replacement costs money for the new ion exchange resins as well as money for disposal of the radioactive waste and requires a place for the disposal. For these reasons, it has been desired to prolong the lives of ion exchange resins.

However, spent fuel pool water that is obtained from a nuclear power plant such as a pressurized-water reactor (PWR) contains pro-oxidants such as hydrogen peroxide which is generated by decomposition of the water subjected to radiation from fuel rods and hydroperoxyl radicals and hydroxyl radicals which are generated from hydrogen peroxide (hereinafter, these pro-oxidants are referred to as "pro-oxidants") and boron which is derived from boric acid added for control of nuclear fission reaction of fuels. In general, spent fuel pool water contains hydrogen peroxide in the order of a few or several ppm and boron in a concentration of about 2000 to about 3000 ppm. Such spent fuel water is treated directly by ion exchange in a purification apparatus for fuel pool water. However, a demineralizer using a granular ion exchange resins cannot remove those pro-oxidants. Hence, the pro-oxidants remain in fuel pool water, waste storage bunker water, and condensate storage water that is recovered after purification of fuel pool water or waste storage bunker water and then stored. In addition, since the pro-oxidants have a very strong oxidizing action, they oxidize cation resins in ion exchange resins and elute polystyrene sulfonic acid (PSS). The eluted PSS is attached to anion exchange resins and decreases their reaction rate. Further, hydrogen peroxide oxidizes and degrades cation exchange resins and, in consequence, sulfate ions and the like are eluted from the cation exchange resins and increase the electric conductivity at an outlet of an ion exchange resins column. The strong oxidizing action of the pro-oxidants contributes to corrosion of steel materials such as pipes and tanks.

It is believed that the main cause of the degradation of ion exchange resins is oxidation of cation exchange resins that is caused by their contact with pro-oxidants contained in such water. To solve this problem, the following methods have been proposed: a method of alkaline decomposition of pro-oxidant by contacting water containing the pro-oxidant with anion exchange resins before contacting the water with cation exchange resins (Patent Document 1: Japanese Patent Publication No. 2000-002787), a method of removing pro-oxidant by contacting it with granular active carbon and a method of removing pro-oxidant by contacting it with ion exchange resins on which platinum group catalyst particles are doped (Patent Document 2: Japanese Patent Publication No. H10-111387), a method of removing pro-oxidant by passing water containing the pro-oxidant through a platinum catalyst coated membrane (Patent Document 3: Japanese Patent Publication No. 2003-156589), a method of removing pro-oxidants by contacting them with active carbon to adsorb them (Patent Document 4: Japanese Patent Publication No. 2008-232773), and a method of removing pro-oxidants by passing water containing the pro-oxidants through a manganese filter (Patent Document 5: Japanese Patent Application No. 2012-217133). However, these methods proposed so far relate to purification of water having a low pro-oxidant concentration of about 0.01 to about 0.001 mg/L, such as nuclear reactor cooling water or radioactive waste water, and there are no examples of application of those methods to purification of spent fuel pool water containing pro-oxidants in a high concentration of 1 mg/L or more as well as boric acid (for example, about 2000 to about 3000 mg/L).

SUMMARY

The present invention aims to reduce pro-oxidants contained in spent fuel pool water from nuclear power plants, especially from pressurized-water reactor (PWR), prolong the life of ion exchange resins in a purification apparatus for fuel pool water, and lower the frequency of replacement of the ion exchange resins.

According to the present invention, there is provided a technique for water treatment at nuclear power plants of pressurized-water reactor (PWR); in the technique, before ion exchange resins are used to demineralize water to be treated that contains pro-oxidants (e.g., hydrogen peroxide) generated by radiolysis of spent fuel pool water from the nuclear power plants of PWR, the water to be treated is contacted with particular metal-doped resins to reduce the pro-oxidants contained in the water, decrease load placed on a demineralizer and maintain the high purity of the treated water as well as prolong the life of the ion exchange resins and reduce generation of spent ion exchange resins that are radioactive secondary wastes.

More specifically, the present invention includes the following embodiments:

[1] A purification method for spent fuel pool water from nuclear power generation, the method comprising: passing the water at a linear flow velocity of about 50 m/h or less through a purification apparatus for the water comprising an ion exchange resin layer and a metal-doped resin layer which is laid at a bed height of about 2 cm or more on a surface layer of the ion exchange resin layer wherein the water to be treated is contacted with the metal-doped resin layer to decompose a pro-oxidant contained in the water; and subsequently contacting the water with the ion exchange resins.

[2] The purification method according to [1], wherein the metal in the metal-doped resin layer is selected from fine particles of palladium, platinum, manganese, iron, and titanium.

[3] The purification method according to [1] or [2], wherein the pro-oxidant is hydrogen peroxide, a hydroperoxyl radical, or a hydroxyl radical.
[4] A treatment method for spent fuel pool water from nuclear power generation, the method comprising: purifying the water to be treated with a purification apparatus for the water by the purification method according to any one of [1] to [3]; and then recycling the purified water to the spent fuel pool to use the water.
[5] A purification apparatus for spent fuel pool water from nuclear power generation, comprising an ion exchange resin layer and a metal-doped resin layer which is laid at a bed height of about 2 cm or more on a surface layer of the ion exchange resin layer.
[6] A treatment apparatus for spent fuel pool water from nuclear power generation, comprising:
a spent fuel pool at a nuclear power plant;
a purification apparatus for the water, comprising an ion exchange resin layer and a metal-doped resin layer which is laid at a bed height of about 2 cm or more on a surface layer of the ion exchange resin layer;
a delivery line for delivering the water from the spent fuel pool to the purification apparatus; and
a spent fuel pool water circulation line for returning the water purified with the purification apparatus to the spent fuel pool.

ADVANTAGEOUS EFFECTS

By using the treatment method and apparatus of the present invention for treating spent fuel pool water from nuclear power plants, pro-oxidants (e.g., hydrogen peroxide) generated by radiolysis of the water with radiation from spent fuels can be decomposed efficiently. Hence, the treatment method and apparatus can prevent oxidative degradation of ion exchange resins filled in a demineralizer and maintain the high purity of the treated water as well as prolong the life of the ion exchange resins and reduce generation of spent ion exchange resins that are radioactive secondary wastes. For treatment of spent fuel pool water from nuclear power plants of PWR, it is an important object to reduce the volume of radioactive secondary wastes, and the present invention that can accomplish those achievements is significant.

PREFERRED EMBODIMENTS

Figure 1:
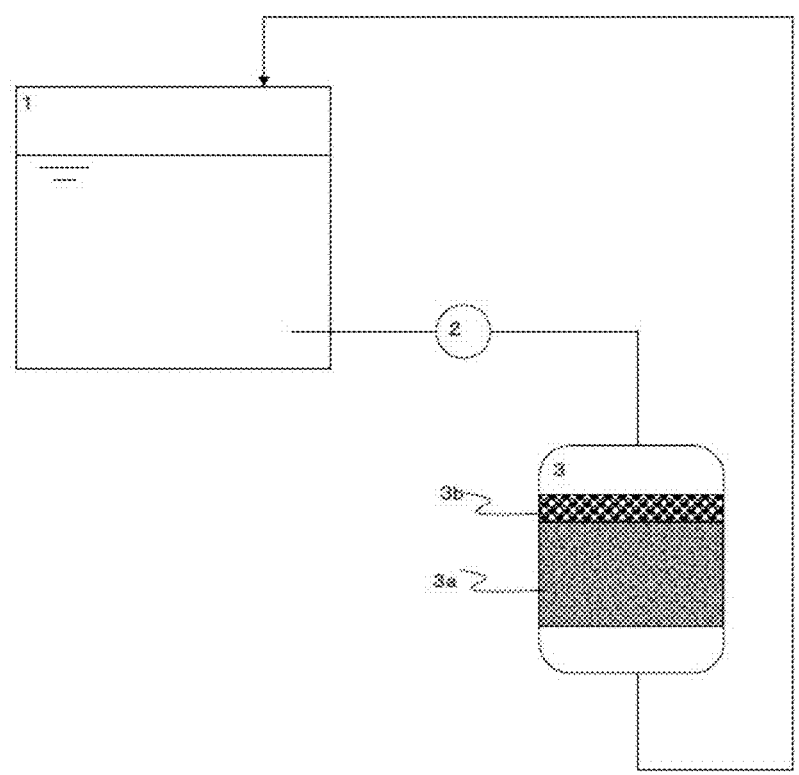
FIG. 1 is a schematic flow diagram of a water treatment apparatus of the present invention for treating spent fuel pool water from a nuclear power plant.

The present invention is described below with reference to the attached drawings, but they are not intended to limit the scope of the invention.
FIG. 1 outlines a flow in a water treatment apparatus of the present invention for treating spent fuel pool water that is obtained from a nuclear power plant. A spent fuel pool 1 is filled with cooling water for cooling storage of a spent fuel rod that is removed from a nuclear reactor (This cooling water is also referred to as "spent fuel pool water"). Since the spent fuel rod that is removed from a nuclear reactor continues emitting radiation even while being stored in fuel pool water, the spent fuel pool water is decomposed by the radiation to generate hydrogen peroxide, hydroxyl radicals or hydroperoxyl radicals. The spent fuel pool water (water to be treated) that is removed from the spent fuel pool 1 (a storage tank for the water to be treated) is transferred via a transfer pump 2 to a fuel pool purification device 3. The fuel pool purification device 3 comprises an ion exchange resin layer 3a in which ion exchange resins are filled and a metal-doped resin layer 3b in which metal-doped resins are filled at a bed height of about 2 cm or more, preferably 5 cm or more, on a surface layer of the ion exchange resin layer 3a. When the bed height is less than about 2 cm, pro-oxidants are not well decomposed. The upper limit of the bed height of the metal-doped resin layer 3b is not particularly limited; however, since a bed height exceeding about 10 cm results in the decreases of the flow velocity and the volume of the treated water, an appropriate bed height should be determined. The pro-oxidants contained in the spent fuel pool water are decomposed when passing through the metal-doped resin layer 3b. Subsequently, impurity ions are removed through the ion exchange resin layer 3a. The demineralized water is recycled to the spent fuel pool 1 as cooling water. The flow volume of water to be treated through the demineralizer 3 is based on a linear flow velocity of about 10 to about 50 m/h. When the linear flow velocity is less than about 10 m/h, the volume of the circulated water is decreased and its cooling effect on the spent fuel rod is diminished. When the linear flow velocity exceeds about 50 m/h, the efficiency of contact of the pro-oxidants with the metal-doped resin is reduced and its capability to decompose the pro-oxidants is diminished.

The ion exchange resin used in the present invention may be a common ion exchange resin that is used in purification apparatuses for spent fuel pool water from nuclear power plants, and is preferably a mixed bed anion and cation exchange resin. For example, a mixed bed ion exchange resin (SNM1, a product of Mitsubishi Chemical Corp.) is suitable.

The metal-doped resin used in the present invention is preferably a strongly basic gel-type spherical resin formed of a polymer resin on which metal particles selected from palladium, platinum, manganese, iron and titanium fine particles are doped.

EXAMPLES

The present invention is described below in more detail by means of examples.

Example 1

A metal-doped resin was used to examine its capability to decompose hydrogen peroxide in an immersion test.
The metal-doped resin was the Pd-doped resin Lewatit (registered trademark) K7333, a product of Lanxess. To a 200 ml beaker, 100 ml of a solution to be treated (Sample 1) containing $H_2O_2$ in a concentration of 20 mg/L and boric acid dissolved in a concentration of 2800 mg/L (as B) was added, 1 ml of the Pd-doped resin was added, and the hydrogen peroxide concentration was determined with time. These hydrogen peroxide and boron concentrations were applied to simulate the quality of fuel pool water that is obtained from a pressurized-water reactor (PWR) nuclear power plant. For reference, the same test was conducted with a boric acid-free solution, i.e., water containing only hydrogen peroxide (This solution is referred to as Sample 2). The hydrogen peroxide concentration was calculated based on absorbance measured at a wavelength of 350 nm with a spectrophotometer by iodometry (Atomic Energy Society of Japan: *PWR Standard Chemical Analysis* 2006). The results are shown in Table 1 and FIG. 2.

TABLE 1

| Immersion time (min) | Conc. (mg/L) of hydrogen peroxide | | |
|---|---|---|---|
| | Control | Sample 2 | Sample 1 |
| 0 | 19.4 | 19.4 | 19.4 |
| 60 | 19.4 | 12.1 | 12.0 |
| 120 | 19.5 | 10.8 | 10.5 |
| 180 | 19.6 | 9.5 | 9.8 |
| 240 | 19.5 | 8.8 | 9.0 |

Figure 2:
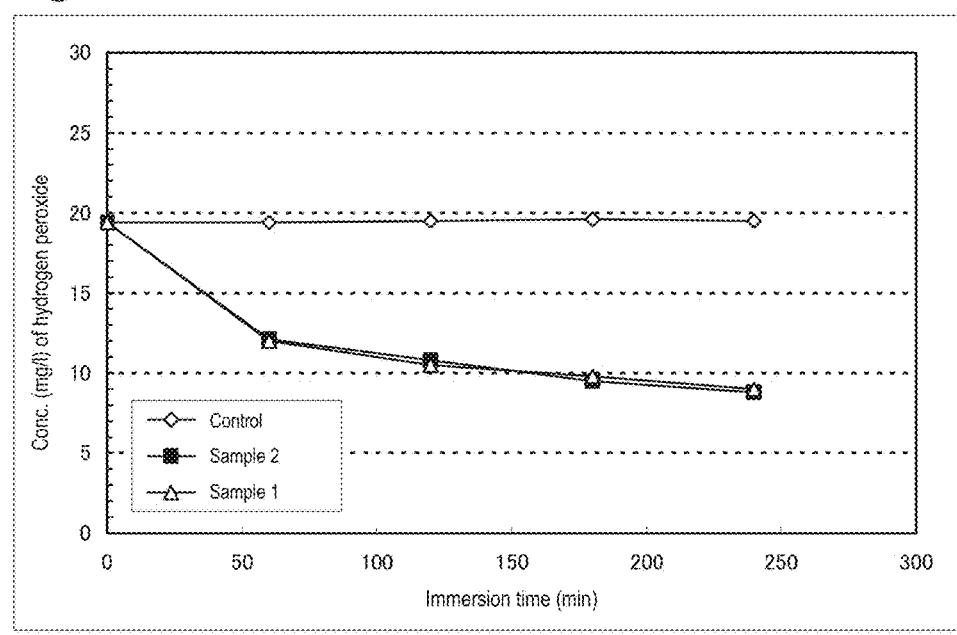
FIG. 2 is a graph showing treatment results of Example 1.

FIG. 2 shows that the Pd-doped resin had such a high capability to decompose hydrogen peroxide that about 50% or more of contained hydrogen peroxide was decomposed at about 2 hours after the start of immersion. The influence of contained boric acid on the capability to decompose hydrogen peroxide was not observed.

Example 2

A metal-doped resin was used to examine its capability to decompose hydrogen peroxide in a test in which hydrogen peroxide-containing water was passed through a column.

The metal-doped resin, which was the Pd-doped resin Lewatit (registered trademark) K7333, a product of Lanxess, was filled at a bed height of about 1 to about 10 cm in a glass column with an inside diameter of about 16 mm. An untreated water comprising $H_2O_2$ adjusted to about 2 mg/L was passed through the column at a linear velocity LV of about 10 to about 70 m/h to examine the hydrogen peroxide removing performance of the metal-doped resin. The results are shown in Table 2 and FIG. 3.

TABLE 2

| Linear flow velocity (m/h) | Hydrogen peroxide decomposition rate (%) by bed height | | | |
|---|---|---|---|---|
| | 1 cm | 2 cm | 5 cm | 10 cm |
| 1 | 95 | 95 | 95 | 95 |
| 10 | 80 | 95 | 95 | 95 |
| 30 | 50 | 95 | 95 | 95 |
| 50 | 10 | 90 | 93 | 95 |
| 70 | 2 | 60 | 80 | 90 |

Figure 3:
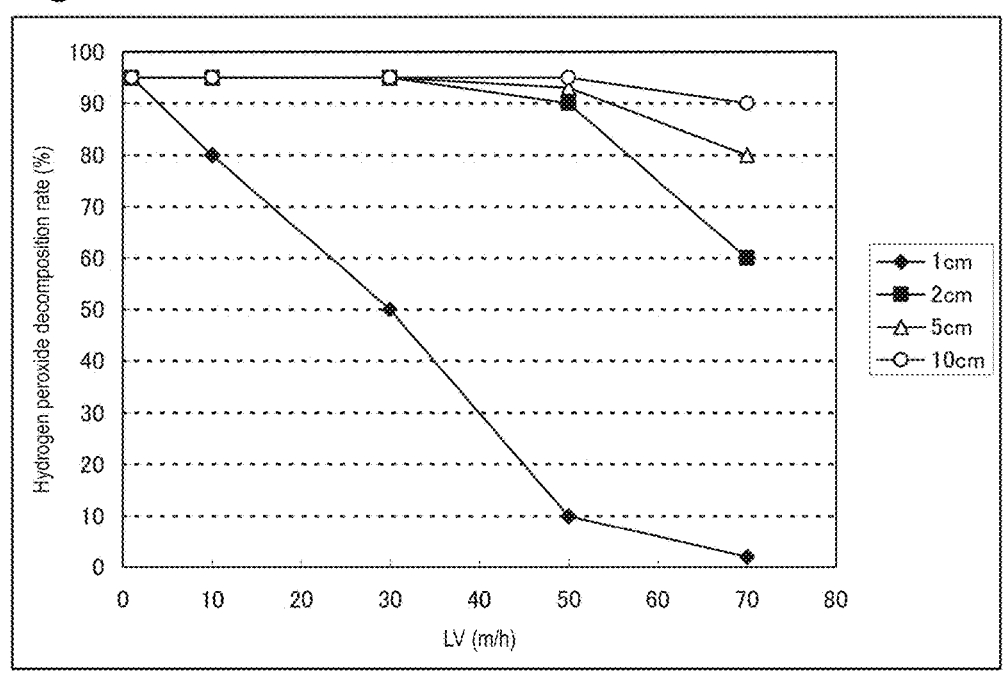
FIG. 3 is a graph showing treatment results of Example 2.

FIG. 3 shows that about 90% or more of hydrogen peroxide can be decomposed at a bed height of about 2 cm or more and an LV of about 50 m/h or less.

Example 3

The influence of hydrogen peroxide on degradation of ion exchange resin was examined.

Figure 4:
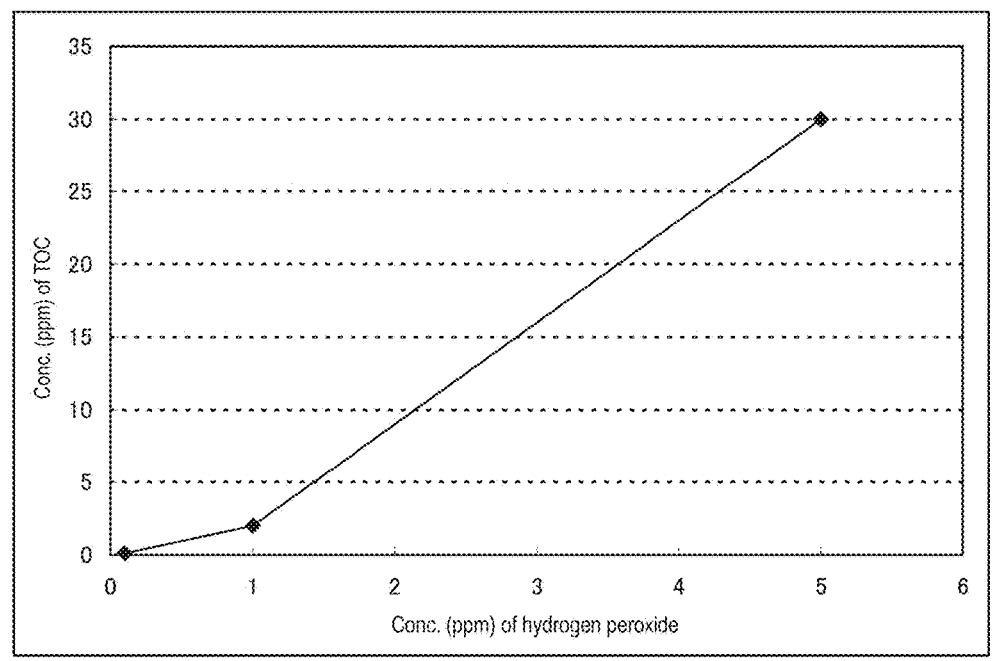
FIG. 4 is a graph showing treatment results of Example 3.

Cation resins of the same type were respectively immersed in solutions having various hydrogen peroxide concentrations for 24 hours and the total organic carbon (TOC) concentrations were measured with TOC-V, a product of Shimadzu Corp. As shown in FIG. 4, it was confirmed that hydrogen peroxide contained in a concentration of less than about 1 ppm had little influence on resin degradation. Hence, it is adequate to decompose 90% or more of hydrogen peroxide present in the order of a few or several ppm in fuel pool.

In general, ion exchange resins are replaced by fresh resins in a TOC concentration of more than about 20 ppm. FIG. 4 shows that when the hydrogen peroxide concentration exceeds about 3.5 ppm, the TOC concentration exceeds about 20 ppm and replacement of ion exchange resin is required. FIGS. 2 and 4 show that untreated water (hydrogen peroxide concentration: 20 ppm) has such a high hydrogen peroxide concentration as to require replacement of ion exchange resin after the water is passed through the resin once, whereas the treatment method of the present invention achieves the hydrogen peroxide decomposition rate of about 95%, decreases the hydrogen peroxide concentration of water to be treated through an ion exchange resin to about 1 ppm or less, and considerably lowers the frequency of replacement of the ion exchange resins.

INDUSTRIAL APPLICABILITY

Before an ion exchange resin is used to demineralize water to be treated that contains pro-oxidants (e.g., hydrogen peroxide) generated by radiolysis of spent fuel pool water from nuclear power plants of PWR, it is possible according to the present invention to reduce the pro-oxidants contained in the water to be treated, decrease load placed on a demineralizer and maintain the high purity of the treated water as well as prolong the life of the ion exchange resins and reduce generation of spent ion exchange resins that are radioactive secondary wastes. Accordingly, the present invention is significant.

What is claimed is:

1. A method for purifying water in a spent fuel pool in a nuclear power plant, the method comprising:
   passing the water at a linear flow velocity of from 30 m/h or more to about 50 m/h or less through a purification apparatus,
   wherein the apparatus comprises an ion exchange resin layer and a metal-doped resin layer laid at a bed height of from about 2 cm or more to about 10 cm or less on a surface layer of the ion exchange resin layer;
   contacting the water with the metal-doped resin layer to decompose a pro-oxidant contained in the water,
   wherein the pro-oxidant comprises hydrogen peroxide; and
   subsequently contacting the water with the ion exchange resins to produce purified water,
   wherein a decomposition rate of hydrogen peroxide in the purified water is 90% or more.

2. The method according to claim 1, wherein the metal in the metal-doped resin layer is selected from the group consisting of fine particles of palladium, platinum, manganese, iron, and titanium.

3. The method according to claim 1 or 2, wherein the pro-oxidant further comprises a hydroperoxyl radical, a hydroxyl radical, or combination thereof.

4. The method according to claim 1 or 2 further comprising recycling the purified water to the spent fuel pool to cool the spent fuel.

* * * * *